(12) United States Patent
Miller

(10) Patent No.: US 9,753,224 B2
(45) Date of Patent: Sep. 5, 2017

(54) FIELD-PROGRAMMABLE OPTICAL COMPONENT

(71) Applicant: The Board of Trustees of the Leland Stanford Junior University, Palo Alto, CA (US)

(72) Inventor: David A. B. Miller, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 51 days.

(21) Appl. No.: 15/080,170

(22) Filed: Mar. 24, 2016

(65) Prior Publication Data

US 2017/0031101 A1   Feb. 2, 2017

Related U.S. Application Data

(60) Provisional application No. 62/138,160, filed on Mar. 25, 2015.

(51) Int. Cl.
*G01B 9/02* (2006.01)
*G02B 6/293* (2006.01)

(52) U.S. Cl.
CPC ..... *G02B 6/29395* (2013.01); *G01B 9/02015* (2013.01); *G01B 9/02075* (2013.01); *G02B 6/2935* (2013.01); *G02B 6/29355* (2013.01)

(58) Field of Classification Search
CPC .............. G02B 6/2935; G02B 6/29355; G02B 6/29395; G01B 9/02015; G01B 9/02062; G01B 9/02067; G01B 9/02075; H04B 10/677
See application file for complete search history.

(56) References Cited

U.S. PATENT DOCUMENTS

| | | | |
|---|---|---|---|
| 8,743,371 B2 | 6/2014 | Langley et al. | |
| 2002/0149684 A1* | 10/2002 | Leveau-Mollier | H04N 5/2176 348/246 |
| 2003/0035619 A1* | 2/2003 | Pfeiffer | G02B 6/29355 385/27 |
| 2009/0324247 A1* | 12/2009 | Kikuchi | G02F 1/225 398/159 |
| 2012/0162656 A1* | 6/2012 | Kawanishi | G02B 6/29355 356/450 |
| 2015/0198859 A1* | 7/2015 | Chen | G02F 1/2257 385/3 |

FOREIGN PATENT DOCUMENTS

WO   WO2012/080714   6/2012

* cited by examiner

*Primary Examiner* — Michael A Lyons
(74) *Attorney, Agent, or Firm* — Lumen Patent Firm

(57) ABSTRACT

Methods are known for implementing general optical functions using wave splitters. However, these methods rely on these wave splitters having maximal extinction ratio, which is difficult to achieve in practice. The present invention provides methods for automatically adjusting wave splitters to provide maximal extinction ratio.

11 Claims, 8 Drawing Sheets

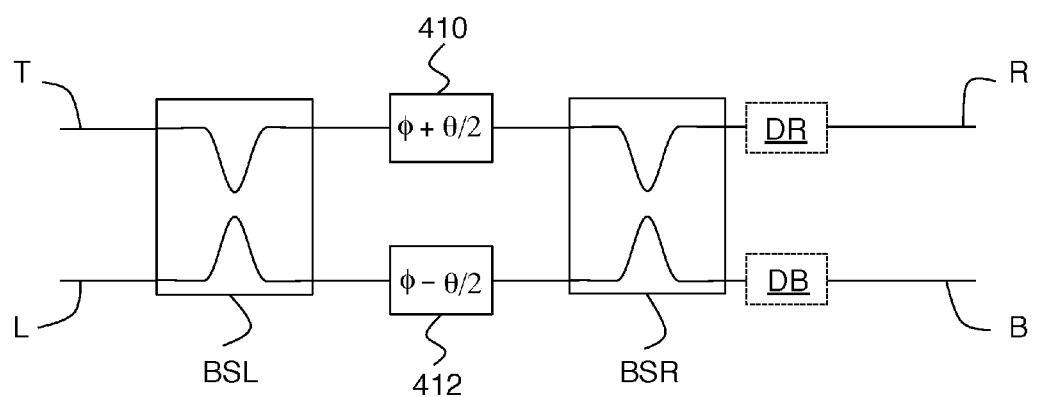
FIG. 4C
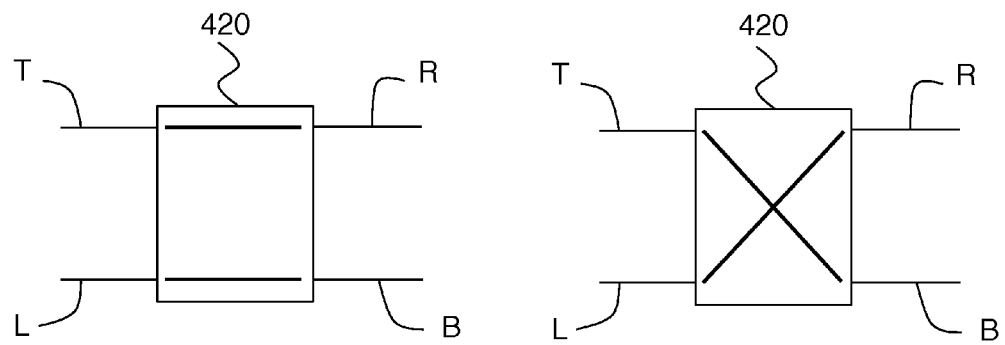
FIG. 4D
FIG. 4E

FIELD-PROGRAMMABLE OPTICAL COMPONENT

CROSS REFERENCE TO RELATED APPLICATIONS

This application claims the benefit of U.S. provisional patent application 62/138,160, filed on Mar. 25, 2015, and hereby incorporated by reference in its entirety.

GOVERNMENT SPONSORSHIP

This invention was made with Government support under contract number FA9550-09-0704 awarded by The Air Force Office of Scientific Research and under contract number FA9550-10-1-0264 awarded by The Air Force Office of Scientific Research. The Government has certain rights in this invention.

FIELD OF THE INVENTION

This invention relates to providing optical interferometers with improved extinction ratio.

BACKGROUND

It has been shown in the literature that interferometers can be used as building blocks to synthesize any desired input-output relation in an optical system. This work is described in detail in application U.S. Ser. No. 14/092,565 by the present inventor entitled "Self-configuring linear component algorithm" (SCLA), filed on Nov. 27, 2013. However, this work assumed that the interferometers being used were capable of providing ideal (or nearly ideal) extinction ratios, where all (or nearly all) of the output power of the interferometer is in one of the two interferometer outputs when the interferometer phase is adjusted appropriately.

In practice, it is difficult to fabricate interferometers to provide ideal extinction ratios. For individual device applications of interferometers, trimming each device after it is fabricated to improve the extinction ratio has been performed. However, this process of individually trimming each device one by one is most undesirable for the SCLA application, where a large number of interferometers may be needed in a system. Individual trimming of each interferometer in such a system could easily be prohibitively expensive.

Accordingly, it would be an advance in the art to provide improved extinction ratios in interferometers, especially in a manner that easily scales to a large number of interferometers.

SUMMARY

In this work, the above-identified problem is addressed by providing methods to automatically adjust interferometers to provide ideal or nearly ideal extinction ratios. Here we assume that the interferometer includes a first wave splitter and a second wave splitter. Formally, it is convenient to label inputs and outputs of these wave splitters as follows. Wave splitter 1 has an input I1-1 and may have an optional input I1-2. Its outputs are O1-1 and O1-2. Wave splitter 2 has inputs I2-1 and I2-2 and has outputs O2-1 and O2-2. In the description below, informal terminology of 'top' (T), 'bottom' (B), 'left' (L) and 'right' (R) is used for interferometer inputs and outputs. This informal terminology can be understood by reference to FIG. 4A.

Here a wave splitter is a passive component that has one or two inputs and two outputs, and which coherently splits power provided to its input or its inputs between its two outputs. Examples include a bulk optics beam splitter as shown on FIG. 4A and waveguide devices such as waveguide Mach-Zehnder interferometers, as shown on FIGS. 2A-C and FIGS. 4B-C. The power splitting can be described in terms of percent transmission from input to outputs. For example, equal output power splitting from input I1-1 would be 50% of the power at input I1-1 going to output O1-1 and 50% of the power input I1-1 going to output O1-2. Such percent transmission T can range, in principle, from 0%<T<100%. As indicated below, wave splitters for this application preferably have a split ratio in a range from 15:85 to 85:15. Such wave splitters would have percent transmission T in a range from 15%<T<85%.

The interferometer includes the first wave splitter, the second wave splitter and a phase adjuster. More specifically, O1-1 is connected to I2-1 and O1-2 is connected to I2-2 by the phase adjuster, where the phase adjuster provides a relative phase $\theta$ between these two connections.

Ideally, the first and second wave splitters would split power equally between their two outputs in cases where only a single input is illuminated. However, this is not usually realized in practice, so it is convenient to quantify the departure from equal power splitting as follows. The first wave splitter has an adjustable first split error $E1=R1-\frac{1}{2}$, where $R1$ is the power transmittance from I1-1 to O1-1. Similarly, the second wave splitter has an adjustable second split error $E2=R2-\frac{1}{2}$, where $R2$ is the power transmittance from I2-1 to O2-1. As indicated above, these split errors are assumed to be adjustable, and maximizing interferometer extinction ratio proceeds by systematically and automatically adjusting these split errors. In the description given below, the first and wave splitters are labeled "left" and "right" instead of being numbered "1" and "2" to expedite the description. Thus E1 and E2 above correspond to the quantities $\delta R_L$ and $\delta R_R$ below, respectively.

It is convenient to define 'bar' and 'cross' states of the interferometer as follows. In the bar state, $\theta$ is selected to maximize transmission from I1-1 to O2-1 relative to transmission from I1-1 to O2-2. In the cross state $\theta$ is selected to maximize transmission from I1-1 to O2-2 relative to transmission from I1-1 to O2-1. Although these definitions suffice to precisely define the bar and cross states of an interferometer (once a labeling of the inputs and outputs is chosen), other equivalent definitions of the cross and bar state are possible. For example, the bar state could also be defined by having $\theta$ selected to maximize transmission from I1-2 to O2-2 relative to transmission from I1-2 to O2-1. Similarly, the cross state could also be defined by having $\theta$ selected to maximize transmission from I1-2 to O2-1 relative to transmission from I1-2 to O2-2. Such equivalences are well known in the art. Another point to note is that the labeling of the interferometer inputs and output is arbitrary. Any consistent labeling can be employed, as is also well known in the art.

Having defined our terms, the basic idea of the present approach can be succinctly stated. Automatic adjustment proceeds via an alternating sequence of the following two steps until a stopping condition is reached.

A) Adjusting E1 and E2 to optimize cross state performance, where changes to E1 and E2 are linked such that their values change by substantially equal amounts; and B) Adjusting E1 and E2 to optimize bar state performance, where changes to E1 and E2 are linked such that their values change by substantially equal and opposite amounts.

A highly significant feature of this approach is that the 2-D optimization of E1 and E2 to maximize extinction ratio is performed as a series of 1-D optimizations. This greatly reduces the difficulty and complexity of performing this optimization. Such simplicity is especially significant in situations where a large number of interferometers needs to be automatically adjusted.

Here 'optimizing' cross state and bar state performance means first setting θ to put the interferometer in the relevant state and then adjusting E1 and E2 as indicated to maximize the observed extinction ratio while holding θ fixed. The sequence used can be ABABAB etc. or BABABA etc. (i.e., it does not matter which step is performed first).

Those of ordinary skill in the art will realize that there are various ways to implement the above approach. For example, maximizing an extinction ratio in practice is often most conveniently done by adjusting E1 and E2 to minimize the power emitted from the 'incorrect' output of the interferometer. However, it is also possible to perform this optimization by maximizing the power emitted from the 'correct' output of the interferometer, or by directly measuring the extinction ratio and adjusting E1 and E2 to maximize the measured extinction ratio. These are all equivalent ways to perform the same adjustment, because the resulting optimal point is the same for all cases.

As indicated above, the split errors E1 and E2 must be adjustable. In cases where the wave splitters are themselves implemented as Mach-Zehnder interferometers, adjustment is via the relative phase of the interferometer used within the wave splitter. Analysis has shown that 50:50 power splitting in the fabricated wave splitters within such an interferometer (as in the wavesplitters inside blocks BSL or BSR in FIG. 2B) is not required. Instead, sufficient adjustment is possible for interferometric wave splitters having a fabricated split ratio in a range from 15:85 to 85:15. Equivalently, it is sufficient that there is some setting of the phase shifters of $\theta_L$ and $\theta_R$ respectively that allows blocks BSL and BSR respectively of FIG. 2B each to achieve 50:50 split ratio.

As described in greater detail below, it is necessary to monitor power emitted from interferometer outputs in order to provide the required information for automatic adjustment. Tap detectors are preferred for this monitoring, where a tap detector absorbs a small fraction of the incident light (preferably 1% or less) and transmits the rest so that its effect on overall system performance is negligible.

Various stopping conditions can be employed to end the iterations (ABABAB or BABABA etc.). A predetermined maximum number of iterations can be implemented. The stopping condition can be going below a predetermined minimum power threshold during power minimization. The stopping condition can be having a change between two successive iterations be below a predetermined threshold during power maximization. These ideas can be combined. For example, combining a maximum number of iterations with a power-based stopping condition will guarantee that an infinite loop cannot occur.

BRIEF DESCRIPTION OF THE DRAWINGS

FIGS. 4A-C show further exemplary interferometer implementations.

FIGS. 4D-E schematically show bar and cross states of an interferometer.

DETAILED DESCRIPTION

Advanced optical functions, such as arbitrary spatial mode converters for telecommunications, linear optical quantum computing gates and circuits, and other non-traditional optics, are challenging to design and implement. Recent work has, however, shown that with meshes of perfect Mach-Zehnder interferometers (MZIs) in technologies such as silicon photonics we could automatically design or even adaptively self-configure any spatial linear optical function. Unfortunately, actual wave splitter ratios inside MZIs may differ significantly from the perfect 50:50 split, preventing such large systems from working properly. We provide a new architecture and a novel self-adjustment approach that can automatically compensate for imperfect fabricated split ratios anywhere from 85:15 to 15:85. Hence, one universal field-programmable linear array (FPLA) optical element could be mass-fabricated, with broad process tolerances. Optimum adjustment and the desired linear function could be simply programmed in the field with progressive automated algorithms, without calculations, allowing implementation of a wide range of complex, precise, linear optical functions.

Attempts to make arbitrary unitary optical processors have shown notable successes in waveguide CNOT gates, for example. Accurately setting the required calculated component values is challenging, however, and both performance and any increased functionality are limited by fabrication and calibration precision. Many design, calibration and setup issues for arbitrary finite-dimensional linear networks can be avoided using self-configuring approaches. Such approaches work by training the network using desired optical inputs and outputs together with a succession of simple single-parameter feedback loops that set up components values one by one by minimizing or maximizing power on photodetectors. The photodetectors can be inside the mesh or external to it. This training automatically designs the network without calculations or multiparameter iteration, and allows adaptation to the problem of interest. Any linear network can be made using only fixed 50:50 wave splitters and phase shifters, but all these approaches implicitly assume precise fabricated wave splitter ratios for perfect operation. Here we show how to relax even that requirement.

Figure 1:
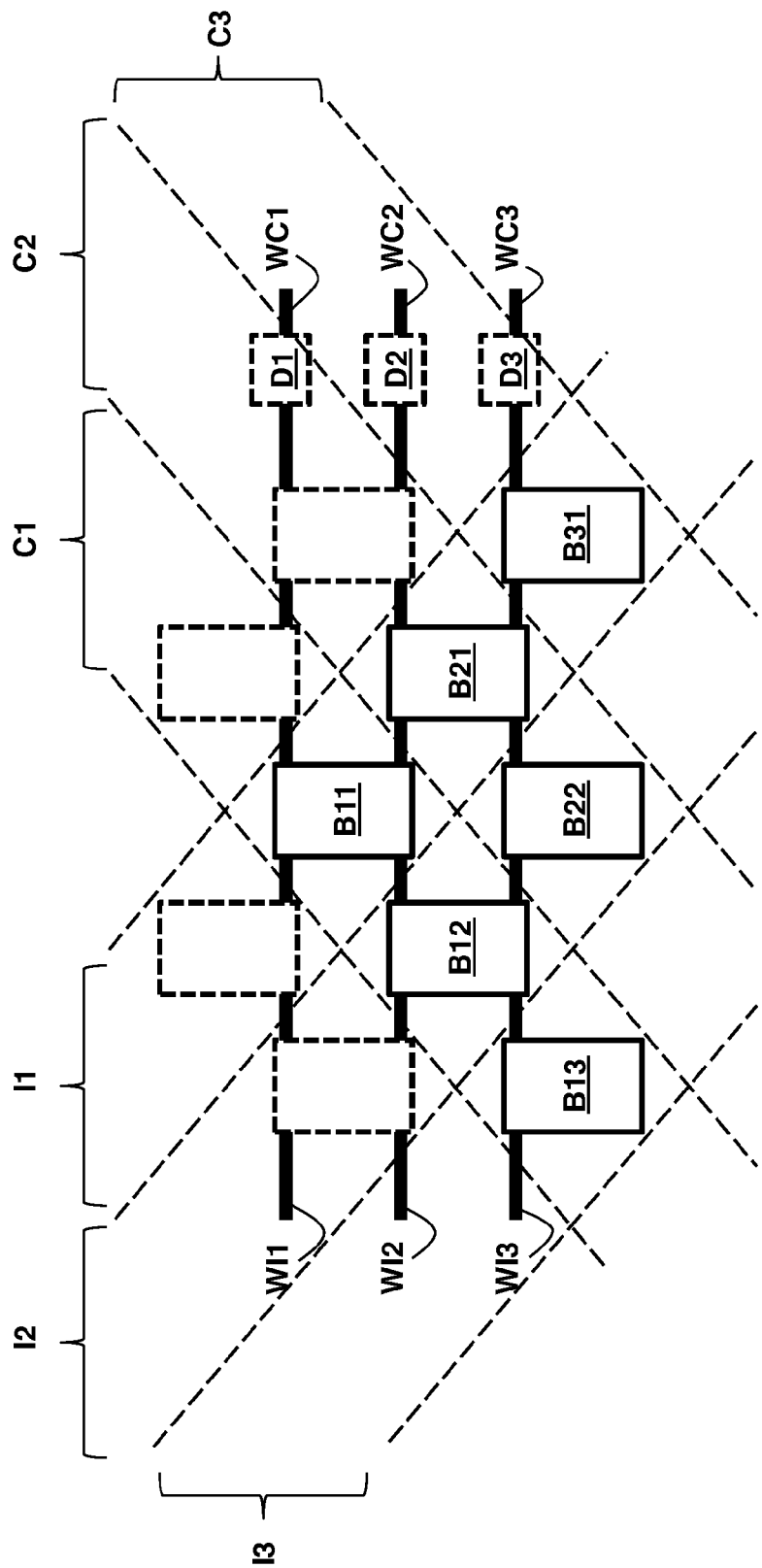
FIG. 1 shows an exemplary optical system including several interferometers.

FIG. 1 shows a unitary transformer for an example 3×3 mesh. The input is the vector of optical amplitudes at some wavelength in the input waveguides WIi. (For mode converters, the actual beam may be sampled in segments, e.g., by grating couplers, into such waveguides.) The mesh multiplies this vector by a unitary matrix defined by the split ratios and phase shifts in the MZI blocks Bij, which can be set by training, giving an output vector as the amplitudes in the channel waveguides WCj. The detectors D1-D3 are optional, depending on whether detectors are included within the blocks. For non-unitary operations, the channel waveguides are fed through modulators to another such unitary block run backwards to give final outputs. The dashed boxes represent optional "dummy" blocks set to the "bar" (straight-through) state that could be added for greater equality of loss or phase delay. Addition of such optional dummy MZI blocks means that all beams interfering on the photodetectors used in feedback loops have passed through the same number of MZIs, so with a given loss in the MZIs, that loss is equal on all such paths, giving a unitary transform that is "perfect" within an overall loss factor. Finally, it can be convenient to refer to input rows I1, I2, I3 and to channel rows C1, C2, C3.

Figure 2A:
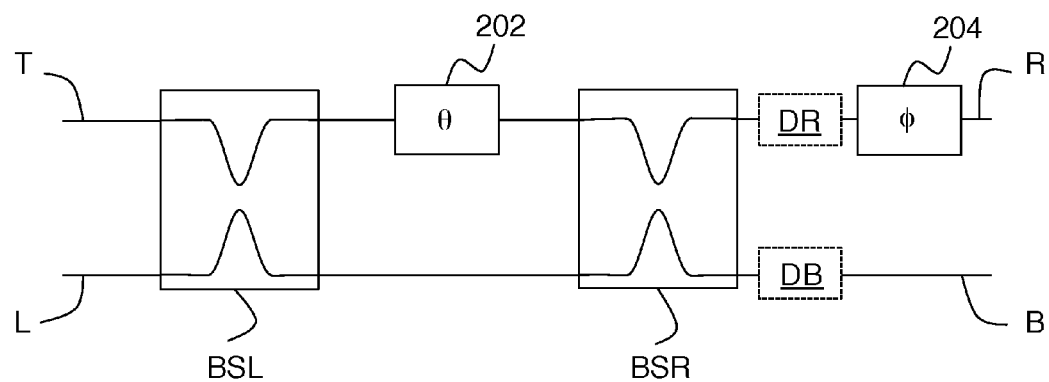
FIG. 2A shows an exemplary implementation of an interferometer.
Figure 2B:
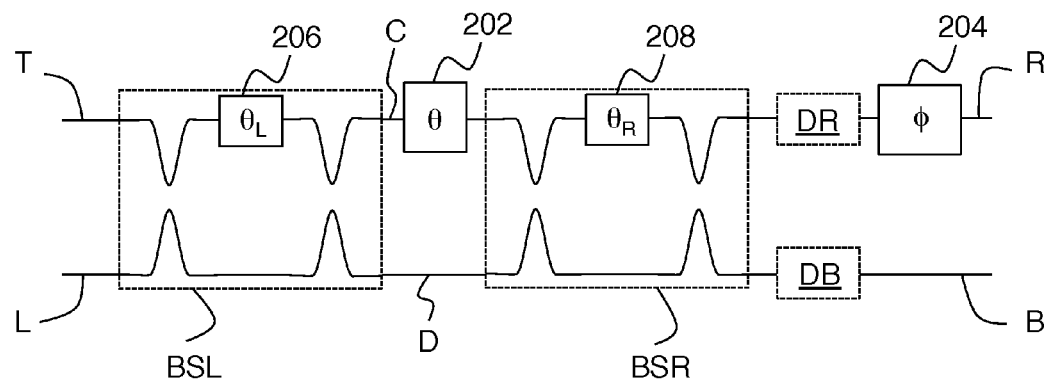
FIG. 2B shows another exemplary implementation of an interferometer.

FIGS. 2A-B show example MZI block implementations. Here "Top" (T), "Bottom" (B), "Left" (L) and "Right" (R) label waveguides in correspondence with the faces of a conventional wave splitter. BSL and BSR are the nominally 50:50 wave splitters. The fabricated split ratios of all wave splitters may differ from this ideal split ratio. DR and DB are optional detectors, which will be mostly transparent, sampling a small amount of the power in their respective waveguides to give the signal for the feedback loops used to set up the block's function. FIG. 2B shows those wave splitters (BSL and BSR) themselves implemented with additional MZIs that may also include wave splitters with fabricated split ratios unintentionally different from 50:50. Here C and D on FIG. 2B refer to the outputs of wave splitter BSL.

These MZI blocks include phase shifter 202 of angle θ to control the split ratio of the MZI and phase shifter 204 of angle φ to control an additional phase. On FIG. 2B, phase shifter 206 of angle $\theta_L$ is within wave splitter BSL, and phase shifter 208 of angle $\theta_R$ is within wave splitter BSR. We expect now that the "left" (BSL) and "right" (BSR) wave splitters inside the MZI have fabricated power "reflectivities" $R_L=|r_L|^2$ and $R_R=|r_R|^2$ respectively (for field "reflectivities" $r_L$ and $r_R$ respectively) that possibly differ from 50%. ("Reflectivity" here means the fraction of the top left input that appears at the upper right output for a given wave splitter or MZI.)

We presume we have some physical way of adjusting the split ratios of wave splitters BSL and BSR (both up and down) after initial fabrication. This could be some trimming of the wave splitters themselves; alternatively, we could use the "Double Mach-Zehnder Interferometer" (DMZI) configuration of FIG. 2B in which the wave splitters are implemented with additional MZIs that may themselves be made with imperfect wave splitters. Here the split ratios of BSL and BSR can be varied by altering the phase shifts $\theta_L$ and $\theta_R$, respectively.

Figure 2C:
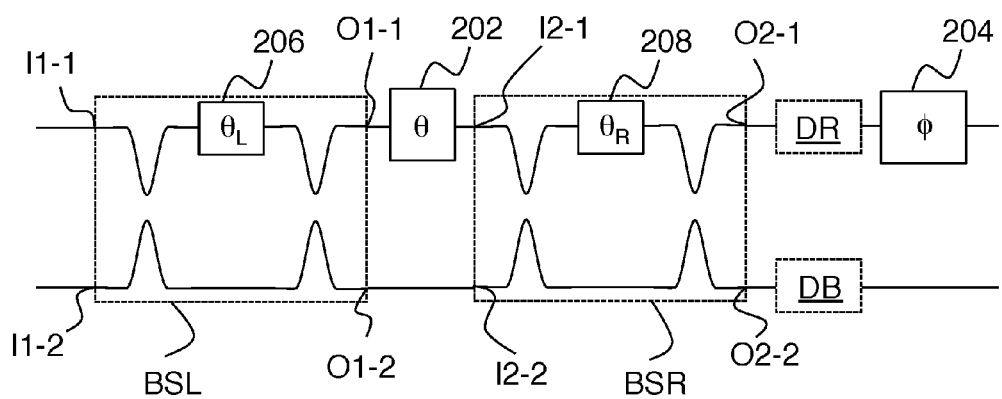
FIG. 2C shows the example of FIG. 2C using systematic notation for inputs and outputs of wave splitters.

FIG. 2C shows the example of FIG. 2B where more systematic notation is used for inputs and outputs of BSL and BSR. Here I1-1 and I1-2 are the inputs of wave splitter BSL, and O1-1 and O1-2 are its outputs. Similarly, I2-1 and I2-2 are the inputs of wave splitter BSR, and O2-1 and O2-2 are its outputs.

Now we construct an algorithm, based only on minimizing or maximizing power in detectors DB or DR, that allows us to set BSL and BSR to 50:50 wave splitting ratios, without calibrating any component.

Defining the reflectivity differences compared to 50%, $\delta R_L=R_L-\frac{1}{2}$ and $\delta R_R=R_R-\frac{1}{2}$, then, for unit input power in a coherent beam into the "top" port T, the power emerging from the "right" R port is $$P_R = \frac{1}{2} + 2\{\delta R_L \delta R_R - [(\frac{1}{4}-\delta R_L^2)(\frac{1}{4}-\delta R_R^2)]^{1/2} \cos \theta\} \qquad (1)$$

θ here includes all the phase differences between the two paths inside the interferometer, and we presume the positive square root. For simplicity, we presume that changing $\delta R_L$ (or $\delta R_R$) does not change the relative phase of the resulting beams in the interferometer arms (though we can handle such phase changes as described below).

Note in Eq. (1), independent of $\delta R_L$ and $\delta R_R$, that the power in detector or monitoring point DR is minimized for the same choice of phase θ—here a choice such that cos θ=1 (e.g., θ=0)—giving $$P_{Rmin} = \frac{1}{2} + 2\{\delta R_L \delta R_R - [(\frac{1}{4}-\delta R_L^2)(\frac{1}{4}-\delta R_R^2)]^{1/2}\} \qquad (2)$$

Such a choice also maximizes the power at output B, with $P_{Bmax}=1-P_{Rmin}$. The power at output R is maximized by choosing a phase θ such that cos θ=−1 (e.g., 0=π), giving $$P_{Rmax} = \frac{1}{2} + 2\{\delta R_L \delta R_R + [(\frac{1}{4}-\delta R_L^2)(\frac{1}{4}-\delta R_R^2)]^{1/2}\} \qquad (3)$$

The condition for maximum power in output R also corresponds to minimum power $P_{Bmin}$ in output B.

Figure 3A:
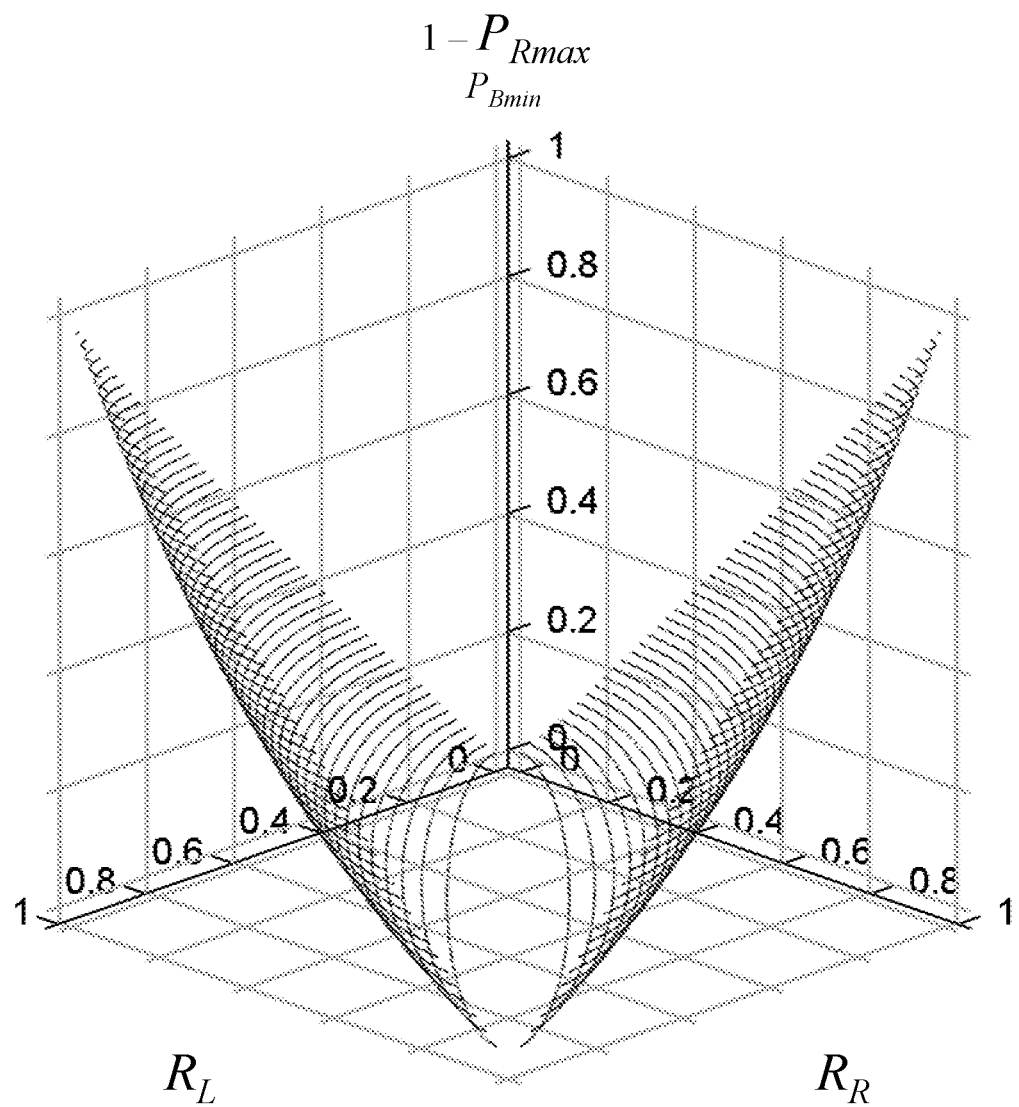
FIGS. 3A-B show examples of how maximizing interferometer extinction ratio via automatic adjustments can occur.

The function $1-P_{Rmax}=P_{Bmin}$ (which is easier to visualize than $P_{Rmax}$) is graphed in FIG. 3A, showing a minimum of zero (so a maximum in $P_{Rmax}$) along the line $\delta R_L=\delta R_R$. The graph of $P_{Rmax}$ is essentially identical but rotated by 90° in the ($R_L$, $R_R$) plane, with its minimum of zero along the line $\delta R_L=-\delta R_R$. These straight lines are sketched in FIG. 3B.

The extinction ratio for the "bar" and "cross" states can be written as $P_{Rmax}/P_{Bmin}$, and $P_{Bmax}/P_{Rmin}$, respectively. Note that for the interferometer to allow both extinction ratios to approach the "perfect" condition of being arbitrarily large we require $\delta R_L=\delta R_R=0$—i.e., 50:50 wave splitters, which corresponds to the point in the center of FIG. 3B where the straight lines cross.

These lines and the convex properties of the functions $P_{Rmax}(R_L, R_R)$ and $P_{Rmin}(R_L, R_R)$ allow an algorithm, based only on minimizing and maximizing powers at DR, that sets both $\delta R_L$, and $\delta R_R$ to zero, thereby making both wave splitters have a 50:50 split ratio.

This "Wave splitter 50:50 setup algorithm" (WFSA) proceeds as follows. We shine a constant power only into the "top" T port throughout the algorithm.
(1) Set the phase shift θ to minimize the power at DR.
(2) Adjust $\delta R_L$ and $\delta R_R$ together, in the same sense (ideally by equal amounts) to minimize the power at DR.
(3) Set the phase shift θ to maximize the power at DR.
(4) Adjust $\delta R_L$ and $\delta R_R$ together, but in the opposite sense (ideally by equal but opposite amounts) to maximize the power at DR.
Repeat steps (1) to (4) if necessary until the minimum power in step (2) is zero (or as small as can be attained) and the maximum power in step (4) is 1 (or as large as can be attained).
(We could also run this algorithm using detector DB, minimizing power ($P_{Bmin}$) at DB in steps (3) and (4), and/or maximizing power ($P_{Bmax}$) at DB in steps (1) and (2).)

Figure 3B:
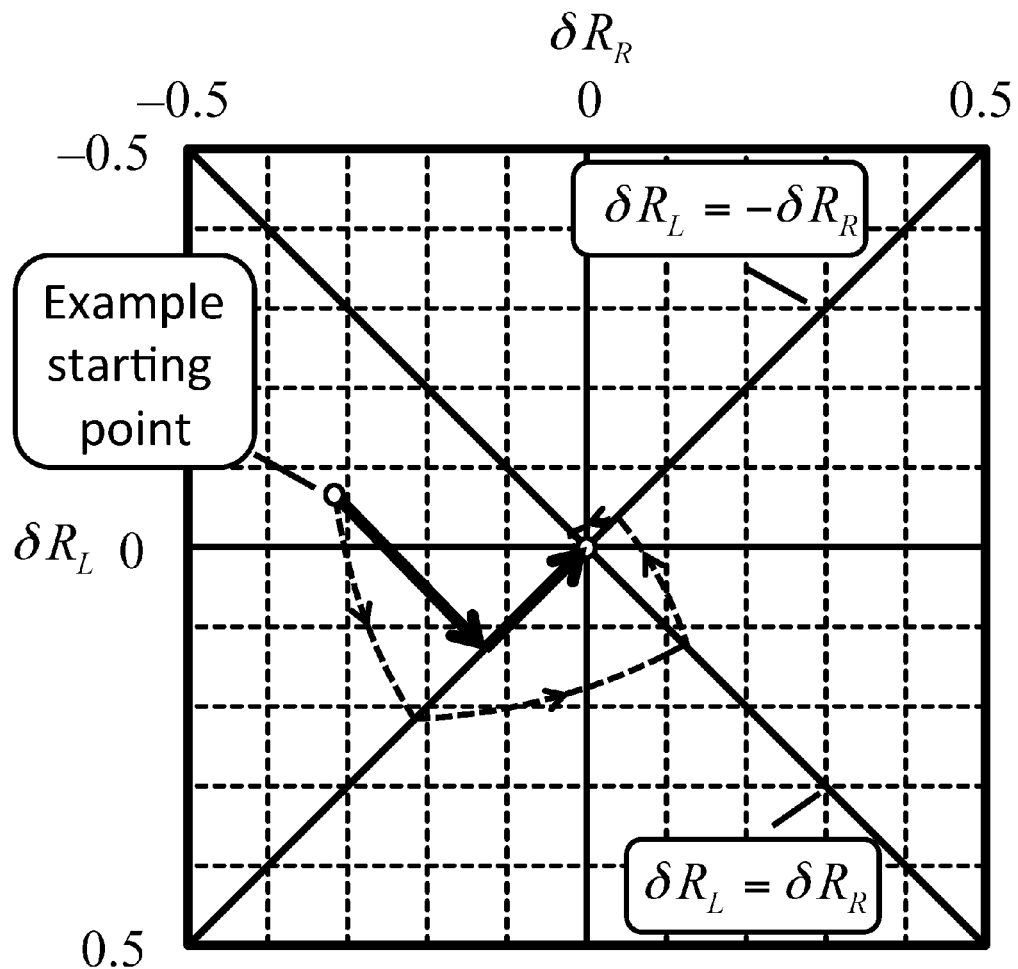

We can see why this works by looking at FIG. 3B. In the ideal case (solid straight arrows) where we can change $\delta R_L$ and $\delta R_R$ by exactly equal amounts for step (2) and by exactly equal and opposite amounts in step (4), this algorithm will converge in one pass through steps (1) to (4). In a more general case (curved dashed lines), as long as the sense of the relative changes is correct in the simultaneous adjustments of $\delta R_L$ and $\delta R_R$ in steps (2) and (4), the algorithm can converge in multiple passes.

For the DMZI implementation, as long as we keep $\theta_L$ and $\theta_R$ both within a range, such as θ to π, so that both cos $\theta_L$ and cos $\theta_R$ are both monotonic in the same sense throughout, we would make same-sense adjustments of $\theta_L$ and $\theta_R$ to change $\delta R_L$ and $\delta R_R$ in the same sense for step (2) and make opposite sense adjustments of $\theta_L$ and $\theta_R$ to change $\delta R_L$ and $\delta R_R$ in the opposite sense for step (4).

So far we have presumed that we can adjust the left and right wave splitters BSL and BSR to be 50:50 splitters; in the DMZI implementation, we are presuming some values of $\theta_L$ and $\theta_R$ allow us to achieve this. We can use our analysis of a MZI above to understand just what range of fabricated wave splitter ratios we can tolerate while still allowing the resulting MZIs to function as 50:50 wave splitters after appropriate adjustment. Specifically, we can re-use the result Eq. (2) above, applying it now to the MZI that constitutes either BSL or BSR in FIG. 2A. Consider BSL for definiteness; now take $\delta R_L$ and $\delta R_R$ to refer to the fixed fabricated wave splitters within BSL and $\theta$ to refer to $\theta_L$.

Our goal is to be able to set BSL to be overall a 50:50 wave splitter by adjusting $\theta$ (i.e., $\theta_L$). So we want $P_B$ to be ½, and hence from Eq. (1)

$$\delta R_L \delta R_R = [(\tfrac{1}{4}-\delta R_L^2)(\tfrac{1}{4}-\delta R_R^2)]^{1/2} \cos\theta \qquad (4)$$

Squaring both sides and noting that $\cos^2\theta \leq 1$ gives $$\delta R_L^2 \delta R_R^2 \leq [(\tfrac{1}{4}-\delta R_L^2)(\tfrac{1}{4}-\delta R_R^2)] \qquad (5)$$

which can be rearranged to give $$\delta R_L^2 + \delta R_R^2 \leq \tfrac{1}{4} \qquad (6)$$

Therefore to impose a limit on the variation $\delta R$ that can be tolerated in all fabricated wave splitters, we need $\delta R^2 \leq \tfrac{1}{8}$, which in turn means $$|\delta R| \leq \frac{1}{\sqrt{8}} \approx 0.35 \qquad (7)$$

So, as long as the fabricated power split ratio in the physical wave splitters lies in the range of 15% to 85%, there is some setting of the phase shifter in the MZI that allows the MZI overall to behave as a 50:50 wave splitter.

Hence, even with fabricated wave splitter ratios anywhere from 15:85 to 85:15, we can make an overall MZI block that behaves as if it had "perfect" 50:50 wave splitters, and we have shown a simple algorithm based only on power maximization or minimization that allows us to set this condition. Finally, we can add a further progressive "Mesh 50:50 setup algorithm (MFSA)" (as described below) that allows us to set all the blocks in the mesh using this approach. Versions of this algorithm can run using detectors either embedded in each block or only externally at the outputs.

After running MFSA, we are then ready to configure the resulting "perfect" mesh for its ultimate function using the "Self-configuring linear component algorithm" (SLCA) "training" approach of U.S. Ser. No. 14/092,565 by the present inventor, filed on Nov. 27, 2013. Such an FPLA element can perform various functions. Unitary examples include a three-way splitter, a C-NOT gate, a Hadamard transform, a Fourier transform, and the equivalent of a lens. Non-unitary examples include spatial differentiation and integration, and power splitters.

Alternate Mach-Zehnder Block Configurations

Figure 4A:
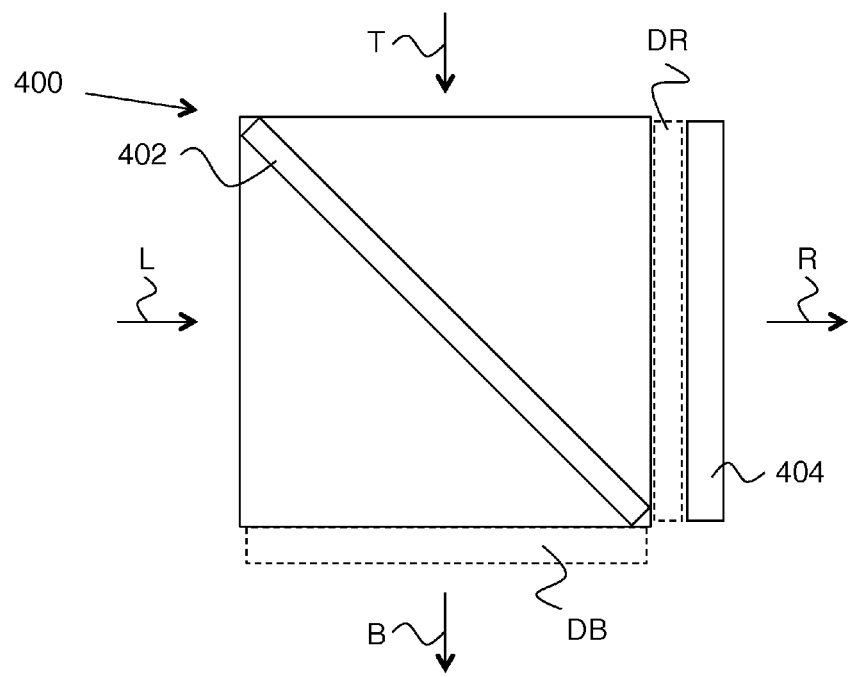
Figure 4B:
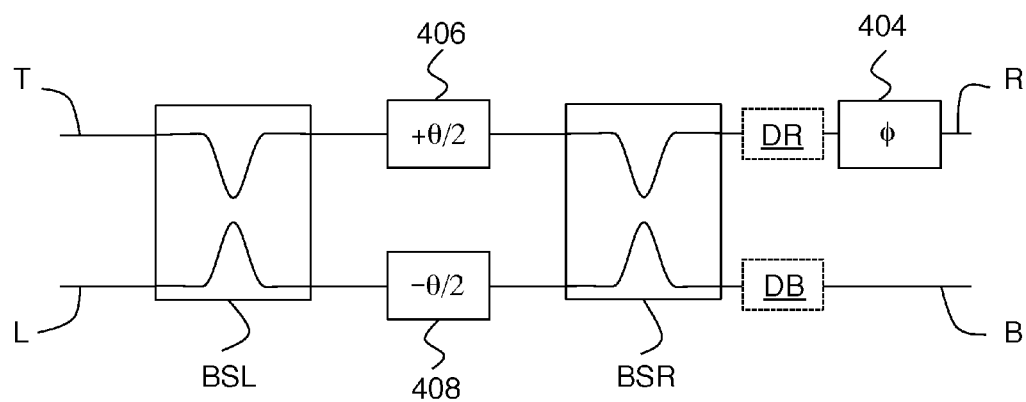

In the implementations of Mach-Zehnder interferometers (MZIs), in general two phase shifters are required somewhere so that both the split ratio and the phase of at least the "Right" output can be controlled. For the automatic algorithms, as long as both of these degrees of freedom exist, various configurations are possible for the MZI blocks. Additional possible configurations are shown in FIGS. 4A-C. As above, T, B, L and R refer to 'top', 'bottom', 'left' and 'right' interferometer ports, respectively, and DR and DB are optional tap detectors.

The configuration of FIG. 4A shows a conceptual implementation based on a conventional bulk optics beam splitter 400 including a controllable reflector 402 and a phase shifter 404 with phase delay $\phi$ in the path from the "Right" port. The waveguide MZI version of FIG. 4B is functionally equivalent to the configuration of FIG. 4A. The split ratio of the MZI in the version of FIG. 4B—the ratio between the "Right" and "Bottom" output powers for a power incident on the "Top" port—is the equivalent of the reflectivity of the controllable reflector in the version of FIG. 4A. In the version of FIG. 4B, this is controlled by two phase shifters 406 and 408 driven differentially, which give a controlled phase difference of $\theta$ between the two interferometer arms. The configuration of FIG. 4C is particularly compact and symmetric, using differential drive of phase shifters 410 and 412 to control the split ratio by altering the phase angle $\theta$, and common mode drive of phase shifters 410 and 412 to vary the output phase angle $\phi$.

These different configurations differ functionally in that they can give rise to different phase shifts of the beam in the "Bottom" output port. For the automatic alignment algorithms, it is of no consequence whether the phase of that "Bottom" output is changed or not. That "Bottom" output is fed into the next "Channel row" of the linear network, and that next row is configured later in the algorithms; that next row can configure itself to take any phase of inputs to the "Top" of its MZIs from the "Bottom" of the preceding row. Though the automatic algorithm does not care about which implementation of the MZI blocks is used, of course the calculated values of the settings of the $\phi$ phase shifters will be different for different MZI block configurations.

FIG. 4D schematically shows a wave splitter 420 in a 'bar' configuration, where connections are mainly made between the T and R ports and between the L and B ports. FIG. 4E schematically shows a wave splitter 420 in a 'cross' configuration, where connections are mainly made between the T and B ports and between the L and R ports.

"No Relative Phase Change" Condition

In the description above, we presumed for simplicity a "no relative phase change" condition in our analysis, by which we mean that, if we shine a beam in the "top" port T in FIG. 2A, the relative phase of the beams transmitted into arms C and D is not changed as we vary the magnitude of the reflectivity $r_L$ of the left wave splitter. That is the behavior that the Double Mach-Zehnder interferometer (DMZI) configuration (FIG. 2B) will show. This is not quite a necessary condition in general for a loss-less wave splitter—an arbitrary phase shift could be added just before point C in FIG. 2B, for example, without violating unitarity. If there were such a relative phase change, in the algorithms below we would need to re-optimize the phase $\theta$ after each adjustment of $r_L$, though that step would be simple to add to the algorithms.

Algorithm for Setting the Wave Splitter Ratios in the Mesh of MZI Blocks

Before introducing the various algorithms formally, we can introduce the algorithm for setting up all the MZI blocks in a unitary mesh as in FIG. 1 so that all the blocks have their (effective) wave splitters set to 50:50. We will call this the "mesh 50:50 setup algorithm" or MFSA for short. For the moment, we presume we have either the DR or DB (mostly-transparent) detectors or power sampling points in the blocks (or possibly both), as shown in FIGS. 2A-B. For this setup, we presume we have sources that we can shine into inputs WI1 to WI3 in FIG. 1, one by one. Here, we will describe the algorithm for these 3 input and 3 output unitary meshes, but the extensions to larger meshes are straightforward. We give formal general versions of all the algorithms below. WFSA below is the "wave splitter 50:50 setup algorithm" as described above.

i) Shine power into WI1 only.
i1) Run WFSA for B11. After completing WFSA, arrange that some power emerges from the lower ("bottom") port of B11 (e.g., by adjusting θ if necessary).
i2) Run WFSA for B21, similarly leaving some power emerging from its "bottom" port.
i3) Run WFSA for B31 (if needed—this block need only be a phase shifter)
ii) Shine power into WI2 only.
iii) Run WFSA for B12, leaving some power emerging from its "bottom" port.
ii2) Run WFSA for B22 (if needed—this block need only be a phase shifter)
iii) Shine power into WI3 only.
iii1) Run WFSA for B13 (if needed—this block need only be a phase shifter)

This MFSA algorithm therefore allows us to set all the (effective) wave splitters in all the MZI blocks to be 50:50.

Thus far, we have described how to set up the (effective) wave splitters using detectors at one or both outputs of each MZI block. We can also run a slightly amended version of the MFSA algorithm without detectors inside the mesh (i.e., inside each MZI block); specifically, we can set up the wave splitter ratios in the entire mesh using only detectors D1-D3, external to the mesh, on the outputs WC1-WC3 respectively, effectively using them instead of the DR detectors inside the blocks. (Again, these need only sample a small amount of the power emerging from these waveguides.) We do this basically by working progressively first through all the MZI blocks on a given input row. A key point is that, after setting up the 50:50 ratios in all the MZI blocks in a row (e.g., B11-B31) in this way we add an algorithm, working backwards up through the row to set all those MZI blocks to the "bar" state—equivalent to perfect "reflection" from "top" to "right" and from "left" to "bottom"; effectively, this makes any such "bar" state MZI block appear as if it were not there at all. The details of this algorithm are given below.

By this additional process of setting all the MZI blocks to the bar state, we leave the mesh in the starting state required for training the mesh for its ultimate function using only the external detectors D1-D3 to run the "Self-configuring linear component algorithm" (SLCA) for the final training of the mesh. If we are using the mostly transparent detectors DB within the mesh, it is not necessary to set the MZI blocks to the bar state before training. Indeed, one major advantage of having the (mostly-transparent) DB detectors in the blocks is that we can be continually retraining the mesh if necessary as the problem changes, without having to reset all the blocks to the "bar" state before any such retraining, allowing a more incremental retraining to proceed all the time, as in tracking moving physical sources, for example.

General Formal Versions of the Alignment Algorithms

We presume there are $M_C$ channel rows and $M_I$ input rows; these numbers need not be equal in general for such processors (though FIG. 1 is drawn for $M_C=M_I$)—we might be mapping $M_C$ orthogonal $M_I$-dimensional vectors to $M_C$ single-mode output waveguides (or channels), for example, where $M_C<M_I$.

For these algorithms, we use the terminology as in FIGS. 1 and 2A-B of the main text, though for greater clarity of notation we will write B(m, n) instead of Bmn in labeling the blocks, WI(n) and WC(m) instead of WIn and WCm respectively, and D(m) instead of Dm.

Several of these algorithms run over all the blocks B(m, n) in the mesh. For simplicity in stating the algorithms, such algorithms can be written to run over n=1 to $M_I$ and m=1 to $M_C$. Because we only actually have a "triangle" of blocks at most in a given unitary mesh (see, e.g., FIG. 1), or fewer if $M_C<M_I$, we test to see if the block exists using an "If block B(m, n) exists" statement. Formally, a block exists if m≤$M_I$-n+1, which means it fits within the "triangle", and if m≤$M_C$, which means it is in one of the channel rows actually implemented in the device.

There are two versions of many of these algorithms depending on whether (i) we embed mostly-transparent detectors or power sampling points inside the mesh or (ii) we use only detectors or power sampling points D(1)-D($M_C$) at the channel "outputs" WC(1)-WC($M_C$). We presume the elements are all loss-less. If we use the additional dummy blocks as discussed at the end of this section, loss in the MZI blocks does not affect the algorithms or the final function of the mesh as long as the loss in all blocks is the same and constant; the output is then simply multiplied by a constant corresponding to the loss in $M_I$ successive blocks.

The algorithms are given in pseudo-code here, with a syntax that is self-evident and similar to BASIC. Non-executable commenting statements are given in italics, starting with "Comment:".

These algorithms are only representative and are meant to indicate that there is at least one reasonable way of implementing all of these configurations and adjustments. There are variations possible, some of which are mentioned here, and alternative approaches that could also be taken.

Algorithm 1—Wave Splitter 50:50 Setup Algorithm (WFSA)

For a given block B(m, n)
Set StoppingCondition to "False"
While StoppingCondition is "False"
  Comment: if the StoppingCondition variable has the value "True", this statement will exit the loop without executing further statements
  Set the phase shift θ to minimize the power at DR (if present) or at D(m) or to maximize the power at DB (if present)
  Adjust $\delta R_L$ and $\delta R_R$ together in the same sense (ideally by equal amounts) (e.g., by adjusting $\theta_L$ and $\theta_R$ together in the same sense by approximately equal amounts) to minimize the power at DR (if present) or at D(m) or to maximize the power at DB (if present)
  Set the phase shift θ to maximize the power at DR (if present) or at D(m) or to minimize the power at DB (if present)
  Adjust $\delta R_L$ and $\delta R_R$ together but in the opposite sense (ideally by equal but opposite amounts) (e.g., by adjusting $\theta_L$ and $\theta_R$ together in the opposite sense by approximately equal amounts) to maximize the power at DR (if present) or at D(m) or to minimize the power at DB (if present)
  If the appropriate stopping condition is met, set StoppingCondition to "True". Comment: There are various different stopping conditions that could be set here. If using power minimization, we can test for the power at DB being below a chosen threshold. If using power maximization, at DR or D(m), we can test to see how close we are to the previous measured maximized value to see if we are below some chosen threshold of difference. Or, we can simply run the loop a specified number of times that we presume is enough for convergence, setting the StoppingCondition to "True" after a loop counter reaches that number
Loop Comment: loop back to the "While" statement
Algorithm 2—Mesh 50:50 Setup Algorithm (MFSA)
Version with Embedded Detectors DR and/or DB in Each Block
For n=1 to $M_I$
  Shine power into WI(n) only
  For m=1 to $M_I$–n+1 Comment: it may not be necessary to run this for m=$M_C$ since that block may just be a phase shifter
    If block B(m, n) exists, run WFSA for B(m, n) using DR and/or DB to detect minimum and maximum powers as required
    Arrange that some (possibly all) power emerges from the lower ("bottom") port of B(m, n) by adjusting θ bin block B(m, n) so some (possibly all) power is detected in DB in that block or so DR power is reduced at least somewhat from its maximum (possibly to zero). Comment: this puts the block in a partial or complete "cross" state. This gives some power into the "top" port of the block in the next channel row (next m) so we will be able to run WFSA on it next.
  Next m
  Comment: this next part of the algorithm works back up through the line of blocks for a given n to set them all to the "bar" state. This is optional, since it is not required just to set up the 50:50 splits, but it is a more desirable and well-defined final state of the mesh for subsequent programming.
  For m=$M_I$–n+1 to 1 step–1 Comment: it may not be necessary to run this for m=$M_I$–n+1 since that block may just be a phase shifter
    If block B(m, n) exists, adjust bin block B(m, n) so DB power is minimized or DR power is maximized
  Next m
Next n
Version without Embedded Detectors
For n=1 to $M_I$
  Shine power into WI(n) only
  For m=1 to $M_C$ Comment: it may not be necessary to run this for m=$M_I$–n+1 since that block may just be a phase shifter
    If block B(m, n) exists, run WFSA for B(m, n) using D(n) to detect minimum and maximum powers as required
    Arrange that some (possibly all) power emerges from the lower ("bottom") port of B(m, n) by adjusting θ in block B(m, n) so D(n) power is reduced at least somewhat from its maximum (possibly to zero) Comment: this puts the block in a partial or complete "cross" state. This gives some power into the "top" port of the block in the next channel row (next m) so we will be able to run WFSA on it next.
  Next m
  Comment: this next part of the algorithm works back up through the line of blocks to set them all to the "bar" state. Though this part of the corresponding algorithm above (for the case with embedded detectors) was optional, here it is needed so that input row of blocks we have just set now appears as if it is essentially not there as we set up the blocks in the next input row.
  For m=$M_I$–n+1 to 1 step–1 Comment: it may not be necessary to run this for m=$M_I$–n+1 since that block may just be a phase shifter
    If block B(m, n) exists, adjust θ in block B(m, n) so D(m–n+1) power is maximized
  Next m
Next n
This version has both set up all the (effective) wave splitters in the MZIs to 50:50 and set all the MZI blocks are in their bar states (i.e., the mesh is implementing an identity matrix).
Algorithm 3—Cross-State Setup Algorithm (CSSA)
This auxiliary algorithm can be used to set up all the blocks (except the lowest row of blocks, which are operating only as phase shifters and hence are always intended to be in their "bar" state if they even contain MZIs) in their "cross" state, where "top" is transmitted completely to "bottom" and "left" is transmitted completely to "right" in each block. This algorithm should be run only after setting all the internal (effective) wave splitters in the blocks to 50:50, i.e., after running Algorithm 2 (MFSA). The blocks can otherwise be in any internal state, i.e., with any starting values of θ and φ in each block.
For n=1 to $M_I$–1
Comment: the upper limit of n=$M_I$–1 is sufficient since the only block with n=MI is in the lowest row, and we do not want to set any of the blocks in the lowest row to the cross state since they are only operating as phase shifters.
  Shine power into WI(n) only
  For m=1 to $M_I$–n
    Comment: this choice of upper limit is so we do not attempt to put the lowest row of blocks (which may anyway just be phase shifters) into the cross state
    If block B(m, n) exists
      Adjust θ in B(m, n) to maximize power in DB (if present) or maximize power in any of D(1)-D($M_C$) in which power is present except for D(m) Comment: Because we do not yet know the state of any blocks of larger m values, we have to consider that power from the "bottom" port of block B(m, n) could in some cases be routed to any of these other outputs. D(m) is the detector in which power will be present if power is coming out of the "right" port of block B(m, n) (which is power we are trying to minimize rather than maximize) so we do not want to maximize with respect to any power in D(m); note that this power is routed there because all of the blocks with smaller values of n have already been set to the "cross" state.
    End if
  Next m
Next n
We could also construct a version of this algorithm based on minimizing power in DR or in D(m).
Algorithm 4—Bar-State Setup Algorithm (BSSA)
This auxiliary algorithm can be used to set up all the blocks (including the lowest row of blocks, which are operating only as phase shifters and hence are always intended to be in their "bar" state if they even contain MZIs) in their "bar" state, where "top" is transmitted completely to "right" and "left" is transmitted completely to "bottom" in each block. This algorithm should be run only after setting all the internal (effective) wave splitters in the blocks to 50:50, i.e., after running Algorithm 2 (MFSA). The blocks can otherwise be in any internal state, i.e., with any starting values of θ and φ in each block.
Version with Embedded Detectors
For n=1 to $M_I$ Shine power into WI(n) only
  For m=1 to $M_C$
    If block B(m, n) exists Adjust θ in block B(m, n) so DB power is minimized
or DR power is maximized
End if
Next m
Next n
Version without Embedded Detectors
Run Algorithm CSSA to set all blocks (except the bottom blocks, which may just be phase shifters) in their "cross" state.
For n=1 to $M_I$
   Shine power into WI(n) only
   For m=$M_I$−n+1 to 1 step−1
     If block B(m, n) exists
       Adjust θ in block B(m, n) so D(m+n−1) power is maximized
     End if
     Comment: we are working back up each "Input" row of blocks, from largest m to smallest m in each row, changing them from "cross" to "bar" states
   Next m
Next n
Note that the function of this algorithm is built into the version of Algorithm 2 (MFSA) for the case without embedded detectors, but is only optional in the version with embedded detectors.
Note on Requirements on Phase Shift Elements All the algorithms presume that we have some way of changing and holding the values of the phases θ, φ, $θ_L$, and $θ_R$ that we may adjust for each block while running the algorithms. We could be controlling the phases through heaters or through voltages on phase shift elements, in which case we would need (e.g., electronic) memories to hold the necessary drive voltages so as to retain these phases between algorithm steps and after we are finished with the algorithms. Alternatively, we might be physically trimming phase shifting elements by adding or subtracting material or physically permanently or semi-permanently changing refractive index.

To run the wave splitter 50:50 setup algorithm (WFSA), we have to be able to change θ by approximately π (i.e., 180°) multiple times, so it may be particularly useful to make that phase shifter voltage-controlled in some fashion, at least during the initial training phase. Otherwise, if we only want a "set-it-and-forget-it" device that we configure only once, the phase shifts could be set by physical trimming. If we use forms of the MZIs with phase shifters in both upper and lower arms, we can increase (decrease) θ, $θ_L$, and $θ_R$ by adding (subtracting) phase delay in the upper arm, and we can decrease (increase) them by adding (subtracting) phase delay in the lower arm; hence we can utilize trimming techniques that can only physically change phase delay in one sense (e.g., by adding material or by removing material). This could be particularly attractive for the $θ_L$ and $θ_R$ phase shifts, which we would hope only to have to adjust once to compensate for fabrication tolerances. To adjust φ, however, we do need to be physically capable of both increasing and decreasing this phase. Also, having both the θ and φ phase shifters voltage-controlled allows the overall function of the device to be reprogrammed.

Use of Dummy Blocks to Equalize Loss

Figure 5:
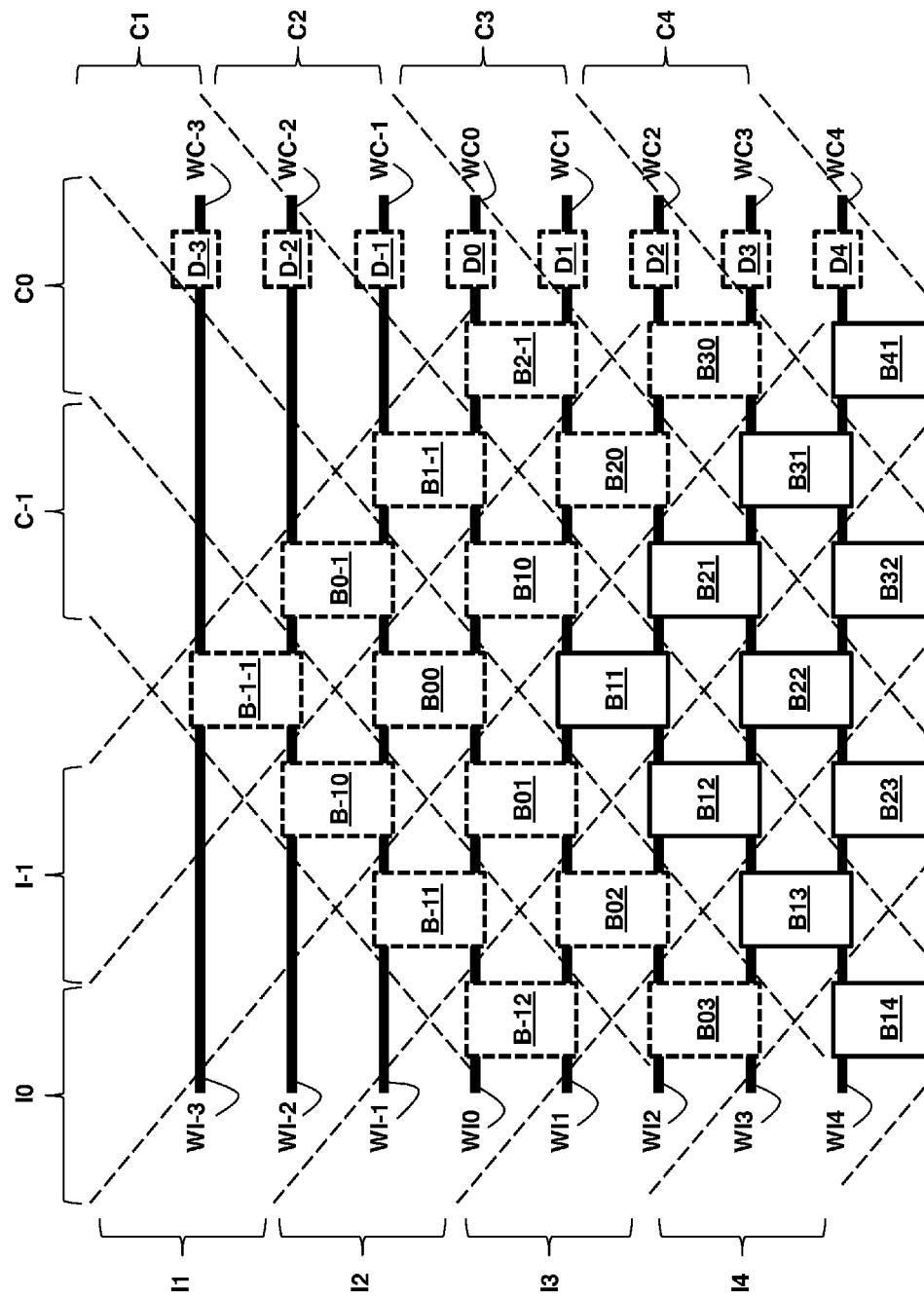
FIG. 5 shows another exemplary optical system including several interferometers.

The mesh as shown explicitly in FIG. 1 has all the necessary blocks for arbitrary configuration of the network, but has different numbers of blocks in different possible "paths" through the network. For example, the path from WI1 to WC1 only passes through one block, whereas the path from WI3 to WC3 passes through three blocks. If we want to equalize background loss or overall delay on all paths, we can add dummy blocks, ultimately to be set in their "bar" state (i.e., complete transmission from "top" to "right" and from "left" to "bottom"). Such a configuration for a 4-input, 4-output mesh is shown in FIG. 5. This shows a 4-input, 4-output mesh with added blocks (with dashed outlines) so all paths from inputs WI1-WI4 to outputs WC1-WC4 through the network encounter the same number of blocks. Ultimately, all of the additional blocks here will be set to their "bar" state so they perform no mathematical function. Here it can be convenient to refer to input rows I-1, I0, I1, I2, I3, I4 and to channel rows C-1, C0, C1, C2, C3, C4, where rows I-1, I0, C-1 and C0 are dummy rows.

To achieve the equal numbers of blocks per path, we only need to add the dummy blocks that lie horizontally on the rows connected to the actual signal paths (i.e., on the horizontal lines from WI3 to WC3, from WI2 to WC2 and from WI1 to WC1 in FIG. 5), which in this example is the set of blocks B03, B02, B01, B10, B20, B30, B-12, and B2-1. To allow training of all of these additional dummy blocks so that their internal (effective) wave splitters are 50:50 and so that they are all set to the "bar" state, we add the rest of the dummy blocks (here B-10, B-1-1, B0-1, B1-1, and B00). We can essentially then use all the same algorithms as we would use for the simpler mesh without the dummy blocks, merely extending Algorithm 2, the mesh 50:50 setup algorithm (MFSA), to also include these dummy blocks. The simplest way to view that extension is as if we had "completed the triangle" of blocks in FIG. 5, imagining that we extended the input rows and channel rows to the bottom of the figure. In the case of FIG. 5, this would involve hypothetically adding blocks B-13, B-14, B-15 to channel row C-1, B04 to channel row C0, and similar hypothetical extensions for input rows I0 and I-1. Then we imagine running MFSA for this larger mesh, just as before, though of course there are no actual settings to set in these hypothetical blocks. The additional inputs (e.g., WI0, WI-1, WI-2, and WI-3 in FIG. 5) and outputs (e.g., the waveguides WC0, WC-1, WC-2, and WC-3 and detectors D0, D-1, D-2, and D-3) are used during the MFSA algorithm (which should also be run to leave all the blocks in the "bar" state at the end).

Note now that every pair of beams that interferes at a given block has passed through the same number of blocks. So, if there is equal loss in every block, the pair of beams has experienced the same attenuation. Hence, the settings the alignment algorithm gives to a particular block are the same as if there was no loss in the blocks. This in turn leads to a conservation of the orthogonality properties of the unitary transform even if the blocks are lossy. The resulting mesh of blocks will behave the same as the lossless set of blocks except for multiplication by a factor that corresponds to the loss in passing through one complete path from input to output. Of course, different loss in different blocks does not lead to this kind of behavior. This does mean, however, that losses like waveguide loss and wave splitter loss do not matter to the function of the system, within an overall loss factor, as long as the waveguide loss and wave splitter loss are sufficiently uniform for all waveguides and wave splitters.

The invention claimed is:

1. A method for adjusting an interferometer to have maximum extinction ratio, the method comprising:
providing an interferometer comprising a first wave splitter having an input I1-1 and having outputs O1-1 and O1-2, a phase adjuster, and a second wave splitter having inputs I2-1 and I2-2 and having outputs O2-1 and O2-2;

wherein O1-1 is connected to I2-1 and O1-2 is connected to I2-2, wherein the phase adjuster provides a relative phase θ between these two connections;

wherein the first wave splitter has an adjustable first split error $E1=R1-\frac{1}{2}$, wherein R1 is a power transmittance from I1-1 to O1-1;

wherein the second wave splitter has an adjustable second split error $E2=R2-\frac{1}{2}$, wherein R2 is a power transmittance from I2-1 to O2-1;

wherein the interferometer has a bar state where θ is selected to maximize transmission from I1-1 to O2-1 relative to transmission from I1-1 to O2-2;

wherein the interferometer has a cross state where θ is selected to maximize transmission from I1-1 to O2-2 relative to transmission from I1-1 to O2-1;

performing an automatic adjustment that includes an alternating sequence of the following steps:
i) adjusting E1 and E2 to optimize cross state performance, wherein changes to E1 and E2 are linked such that their values change by substantially equal amounts;
ii) adjusting E1 and E2 to optimize bar state performance, wherein changes to E1 and E2 are linked such that their values change by substantially equal and opposite amounts.

2. Optical apparatus comprising:
an interferometer comprising a first wave splitter having an input I1-1 and having outputs O1-1 and O1-2, a phase adjuster, and a second wave splitter having inputs I2-1 and I2-2 and having outputs O2-1 and O2-2;

wherein O1-1 is connected to I2-1 and O1-2 is connected to I2-2, wherein the phase adjuster provides a relative phase θ between these two connections;

wherein the first wave splitter has an adjustable first split error $E1=R1-\frac{1}{2}$, wherein R1 is a power transmittance from I1-1 to O1-1;

wherein the second wave splitter has an adjustable second split error $E2=R2-\frac{1}{2}$, wherein R2 is a power transmittance from I2-1 to O2-1;

wherein the interferometer has a bar state where θ is selected to maximize transmission from I1-1 to O2-1 relative to transmission from I1-1 to O2-2;

wherein the interferometer has a cross state where θ is selected to maximize transmission from I1-1 to O2-2 relative to transmission from I1-1 to O2-1;

wherein the apparatus is configured to perform an automatic adjustment that includes an alternating sequence of the following steps:
i) adjusting E1 and E2 to optimize cross state performance, wherein changes to E1 and E2 are linked such that their values change by substantially equal amounts;
ii) adjusting E1 and E2 to optimize bar state performance, wherein changes to E1 and E2 are linked such that their values change by substantially equal and opposite amounts.

3. The apparatus of claim 2, wherein the first wave splitter comprises a waveguide Mach-Zehnder interferometer having a fabricated split ratio in a range from 15:85 to 85:15.

4. The apparatus of claim 2, wherein the second wave splitter comprises a waveguide Mach-Zehnder interferometer having a fabricated split ratio in a range from 15:85 to 85:15.

5. The apparatus of claim 2, further comprising a tap detector configured to monitor power emitted from O2-1.

6. The apparatus of claim 2, further comprising a tap detector configured to monitor power emitted from O2-2.

7. The apparatus of claim 2, wherein the apparatus is configured to automatically halt the alternating sequence of the steps (i) and (ii) when a stopping condition is satisfied.

8. The apparatus of claim 7, wherein the stopping condition is reaching a predetermined maximum number of iterations.

9. The apparatus of claim 7, wherein the stopping condition is measure power going below a predetermined minimum power threshold during power minimization.

10. The apparatus of claim 7, wherein the stopping condition is having a change in measured power between two successive iterations be below a predetermined threshold during power maximization.

11. The apparatus of claim 2, wherein the first wave splitter has an input I1-2.

* * * * *